March 19, 1929.  H. D. ELLIOTT  1,705,605

SNIPPING MACHINE

Filed Aug. 5, 1924

INVENTOR-

Harry D. Elliott
By his Attorney,
Nelson M. Howard

Patented Mar. 19, 1929.

1,705,605

UNITED STATES PATENT OFFICE.

HARRY D. ELLIOTT, OF BEVERLY, MASSACHUSETTS, ASSIGNOR TO UNITED SHOE MACHINERY CORPORATION, OF PATERSON, NEW JERSEY, A CORPORATION OF NEW JERSEY.

SNIPPING MACHINE.

Application filed August 5, 1924. Serial No. 730,225.

This invention relates to cutting machines and is herein illustrated as embodied in a machine for slitting the margins of parts of uppers of boots and shoes.

In the manufacture of boots and shoes, it is customary to fold the margins of certain parts of the upper such, for example, as vamps and tips; and in order that smooth folds may be made in margins, the edges of which are concave, it is customary to slit the margins in such localities preparatory to the folding operation.

The present invention provides novel and improved mechanism for performing this slitting operation. The illustrative machine is provided with a table or support over which extends a stationary shear member and with a cooperating cutter which is reciprocated through a slot in the table by mechanism located beneath the table. With this construction the operator has a clear view of the work at all times and can therefore work with greater precision and speed than was formerly the case.

These and other features of the invention, including certain details of construction and combinations of parts, will be described as embodied in an illustrative machine and pointed out in the appended claims.

Referring now to the accompanying drawings.

Figure 1:
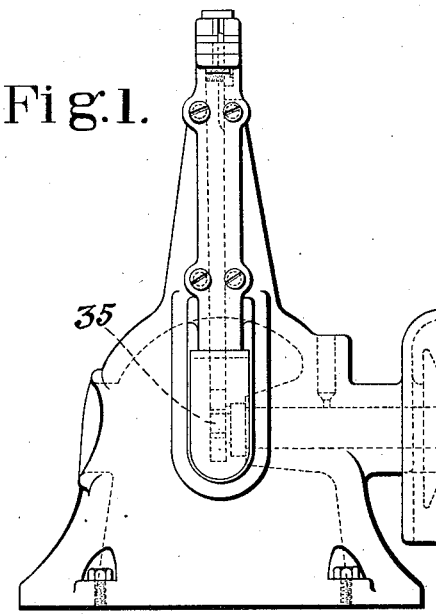
Figure 1 is a front elevation of a machine in which the present invention is embodied.
Figure 2:
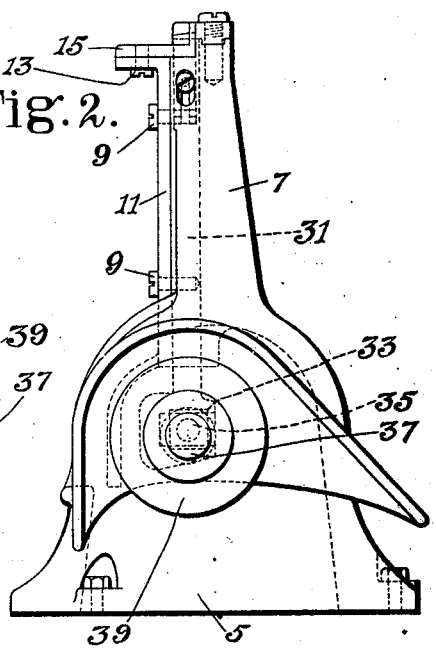
Figure 2 is a side elevation.
Figure 3:
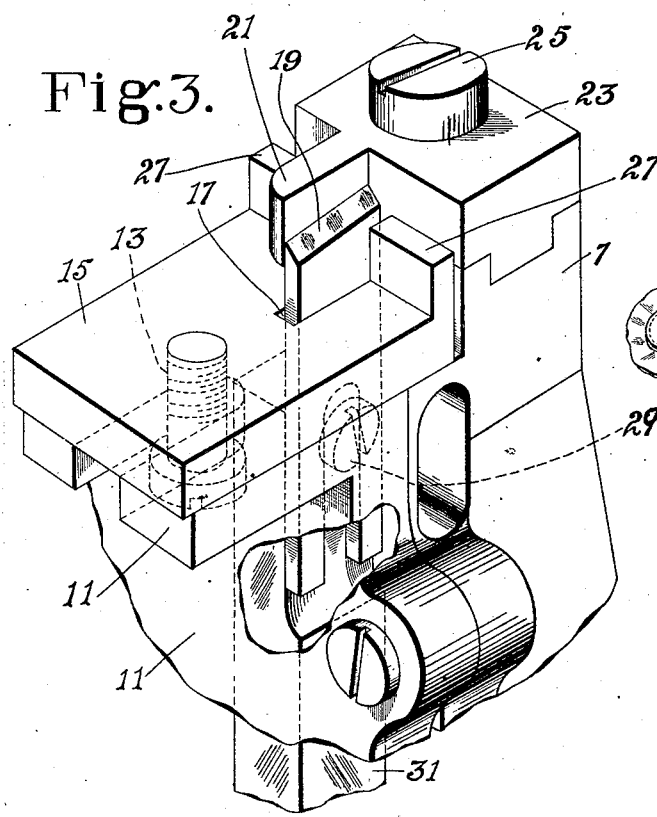
Figure 3 is a perspective, on a greatly enlarged scale, of the work-engaging parts of the machine.

The machine comprises a base 5 and a vertical pedestal 7 to the front side of which is fastened by screws 9 and angle plate 11, the right-angled extension at the top of which is slotted to receive a screw 13 by which is adjustably fastened in place a work support 15. The forward end of this work support is slotted at 17 to permit a reciprocating cutter 19 to extend up through it; and extending over the work support is a stationary shear member 21 located in position to cooperate with the reciprocating cutter 19. The stationary shear member is integral with a block 23 having a tongue and groove connection with the top of the pedestal 7 and held in adjusted position by a screw 25 which passes through a slot in the block and is threaded into the pedestal. The lower face of the shear member is spaced above the work support far enough to permit the thickest piece of work which is to be operated upon to be pushed beneath it into the path of the reciprocating cutter. The cutter is shown in Figure 3 in its uppermost position. In its lowermost position its edge is below the level of the work support. It should be noted that the edge of the cutter is inclined downwardly from the block 23 toward the front of the machine so that its cut, when it rises, is a progressive one from the edge toward the body of the material. In order to determine the length of slit which will be produced, an edge gage is provided in the form of two upwardly extending projections 27 formed at the inner end of the work support 15.

The cutter 19 is adjustably fastened by a screw 29 to a cutter bar 31, which is vertically slidable in suitable bearings and has at its lower end a yoke to receive a square block 33. A crank-pin 35 on a shaft 37 extends into a hole in the block, whereby, when the shaft is rotated by application of power to the pulley 39 the cutter is reciprocated.

Figure 4:
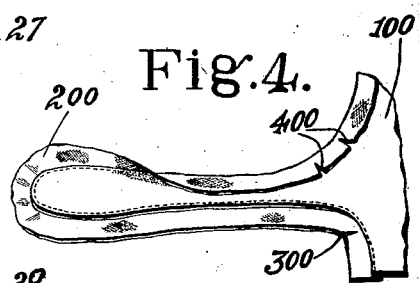
Figure 4 is a plan of a portion of the upper of a shoe showing the margin after it has been slit and after it has been slit and folded.

In Fig. 4 there is shown part of the upper of a strap sandal, the part consisting of a piece of leather 100 to which has been stitched a strip of cloth binding. The part has two concavely curved edges; and it is desirable that the binding, in the locality of these curved edges, be slit preparatory to folding the binding about the edge of the leather. At 300 is shown a slit, and at 400 two such slits as they appear after the binding has been folded.

In the operation of the machine the operator grasps the binding with his thumbs and forefingers at two localities one on each side of the locality in which the slit is to be produced, holds the binding taut, and moves the work over the table 15 until the edge of the binding contacts with the gages 27. The depth of the slit in any given case depends upon the position of the gages, and this position may be varied by loosening the screw 13 and moving the work support.

Although the invention has been set forth as embodied in a particular machine, it should be understood that the invention is not limited in the scope of its application to the particular machine which has been shown and described.

Having thus described my invention, what I claim as new and desire to secure by Letters Patent of the United States is:—

1. A machine for slitting the margin of a piece of sheet material having, in combination, a combined work support and edge gage having an opening therein, a cutter adapted to travel up through the opening, a shear member overhanging the work support in position to cooperate with the cutter, and means for reciprocating the cutter, the combined work support and edge gage being adjustable to determine the length of the slit produced in the sheet material.

2. A machine for slitting the margin of a piece of sheet material having, in combination, a support for the sheet material having an opening therein, gages for the edge of the sheet material, said gages projecting above the support and being located one on each side of the opening, a stationary shear member extending between the gages and overhanging the support, a cutter extending up through the opening into position to cooperate with the shear member, and means for operating the cutter.

3. A machine for slitting the margin of a piece of sheet material having, in combination, a support for the sheet material having an opening therein, gages projecting above the support and located one on each side of the opening, means whereby the gages may be adjusted lengthwise of the opening, a stationary shear member extending between the gages and overhanging the support, a cutter extending up through the opening into position to cooperate with the shear member, and means for operating the cutter.

In testimony whereof I have signed my name to this specification.

HARRY D. ELLIOTT.